(12) United States Patent
Koenig et al.

(10) Patent No.: US 7,218,982 B1
(45) Date of Patent: May 15, 2007

(54) SYSTEM AND METHOD FOR REQUESTING DELIVERY OF SEQUENCED PARTS

(75) Inventors: Tamara S. Koenig, Spencerville, OH (US); Bradley J. Morrison, Columbus, OH (US); Kevin Wade, Plain City, OH (US); Biju Vendrappilly, Emakulam (IN)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 11/000,785

(22) Filed: Nov. 30, 2004

(51) Int. Cl.
*G06F 19/00* (2006.01)

(52) U.S. Cl. .................. 700/100; 700/106; 700/116

(58) Field of Classification Search .......... 700/99–101, 700/106, 115, 116, 213–216, 219–226; 705/22, 705/28, 29
See application file for complete search history.

(56) References Cited

U.S. PATENT DOCUMENTS

| | | | |
|---|---|---|---|
| 5,038,283 A | 8/1991 | Caveney | 36/403 |
| 5,699,259 A | 12/1997 | Colman et al. | 364/468.05 |
| 5,720,157 A | 2/1998 | Ross | 53/445 |
| 5,793,633 A | 8/1998 | Noguchi et al. | 364/468.01 |
| 5,953,234 A | 9/1999 | Singer et al. | 364/478.02 |
| 6,148,291 A * | 11/2000 | Radican | 705/28 |
| 6,185,479 B1 | 2/2001 | Cirrone | 700/216 |
| 6,341,271 B1 * | 1/2002 | Salvo et al. | 705/28 |
| 6,405,100 B1 | 6/2002 | Christ | 700/216 |
| 6,415,266 B1 | 7/2002 | Do | 705/28 |
| 6,529,797 B2 | 3/2003 | Williams et al. | 700/216 |
| 6,560,508 B1 | 5/2003 | Radican | 700/214 |
| 6,631,606 B2 | 10/2003 | Lawton et al. | 53/473 |
| 6,705,523 B1 * | 3/2004 | Stamm et al. | 235/385 |
| 6,711,798 B2 | 3/2004 | Sanders et al. | 29/407.01 |
| 2002/0169698 A1 | 11/2002 | Chien | 705/28 |
| 2003/0208418 A1 | 11/2003 | Caputo et al. | 705/28 |
| 2004/0002788 A1 | 1/2004 | Morimoto et al. | 700/214 |
| 2004/0030428 A1 | 2/2004 | Crampton et al. | 700/101 |
| 2004/0059649 A1 * | 3/2004 | Sakuma et al. | 705/28 |
| 2004/0128213 A1 * | 7/2004 | Wei | 705/28 |
| 2005/0065828 A1 * | 3/2005 | Kroswek et al. | 705/7 |
| 2006/0036498 A1 * | 2/2006 | Iida et al. | 705/15 |

* cited by examiner

*Primary Examiner*—M. N. Von Buhr
(74) *Attorney, Agent, or Firm*—Standley Law Group LLP

(57) ABSTRACT

A system and method for requesting delivery of sequenced parts that accounts for parts in inventory is disclosed. Production schedule data is used to determine gross-based requirements that are modified based on inventory data to determine net-based requirements. Parts are delivered in containers. The system and method support small lots and allow parts to be mixed within a container. Parts are sequenced within the containers as well as on trailers that transport the part containers to the production facility. A lot sequence number indicates the order in which lots are consumed during production and therefore, packed in a container. The lot sequence number further indicates the priority for loading containers on a trailer. A batch number is used to link lot numbers.

22 Claims, 3 Drawing Sheets

200

Requirements

| Seq | Batch | Lot | Part | Qty |
|---|---|---|---|---|
| 1 | 123456 | 110 | X | 30 |
| 2 | 123456 | 120 | X | 30 |

200a
Lot = 30
Batch = 60
Container = 60

200b

| 1X | 2X |
|---|---|

Delivery Batch

202

Requirements

| Seq | Batch | Lot | Part | Qty |
|---|---|---|---|---|
| 1 | 345678 | 210 | A | 10 |
| 2 | 345678 | 220 | B | 10 |
| 3 | 345678 | 230 | C | 10 |
| 4 | 345678 | 240 | A | 30 |

202a
Small Lot = 10
Lot = 30
Batch = 60
Container = 60

202b

| 3C |    | 4A |
|---|---|---|
| 2B |    |    |
| 1A |    |    |

(Top View)

Small Lot Batch

204

Requirements

| Seq | Batch | Lot | Part | Qty |
|---|---|---|---|---|
| 1 | 678901 | 310 | D | 15 |
| 2 | 678901 | 320 | E | 15 |
| 3 | 678901 | 320 | E | 30 |
| 4 | 987601 | 330 | D | 30 |
| 5 | 987601 | 340 | E | 30 |

204a
Small Lot = 15
Lot = 30
Batch = 60
Container = 120

204b

| 3E | 4E |
|---|---|
| 2E | 3D |
| 1D |    |

(Pack Order specific by supplier)

Small Lot Batch

Fig. 2

SYSTEM AND METHOD FOR REQUESTING DELIVERY OF SEQUENCED PARTS

FIELD OF THE INVENTION

The present invention relates generally to systems and methods for requesting delivery of sequenced parts to a manufacturing production line. In particular, the present invention relates to a system and method for requesting delivery of sequenced parts that accounts for parts in inventory as identified in a material requirements planning system and that uses lot sequence numbers for loading parts in containers and transport vehicles.

BACKGROUND OF THE INVENTION

Many manufacturers today require their suppliers to deliver parts that have been sequenced according to production schedule requirements. To facilitate the manufacturing process, the parts are packaged in the order they are consumed on the production line. The sequencing of parts is coordinated with the items to be manufactured on the production line so that associates simply select the parts from the package or container in order and install them on the manufactured items.

Parts sequencing facilitates the manufacturing process in several ways. First, associates are not required to take the time that might be needed to search for the appropriate part within a package or container. Furthermore, it reduces the likelihood that an incorrect part will be installed on the manufactured item. Because the parts are sequenced for selection from the package or container in order, the associate always takes the part that is next in line according to the parts ordering. Finally, it reduces the handling of parts and therefore, reduces the likelihood that parts will be damaged due to handling. Parts sequencing, therefore, helps to maintain or even increase product quality.

In the automobile industry, many automakers are implementing "in-line vehicle sequencing (ILVS)" programs with their suppliers to reduce costs and increase efficiency. Sequencing requirements are typically transmitted from manufacturers to suppliers in the form of an 866 EDI (Ship to Sequence Requirements) transaction. The transaction outlines the sequence of the items needed to build the product and is used by the supplier to package the parts. Although there are benefits to sequencing parts for production, there are associated costs that manufacturers need to consider. First, requiring suppliers to sequence parts prior to delivery increases the costs of the parts to the manufacturer. The supplier incurs costs associated with sequencing the parts within a package and typically passes those costs on to the manufacturer. In addition, the amount of data that is present in an 866 EDI transaction is often significant.

Data transmission costs are further increased when the manufactured product requires a significant number of parts. In the case of ILVS programs, sequencing may be requested for many components, including doors, seats, wheels, exhaust systems, axles, and even engines that are integrated to form a complete vehicle. The data transmission costs for 866 EDI transactions can be very high because of the volume of data present in each transaction and because of the number of transactions that are required to obtain the sequenced parts. Furthermore, some manufacturers may request sequenced parts even when it is not really necessary.

Another reason that parts sequencing is costly to manufacturers, especially to automakers that use ILVS, is that the sequenced parts requests are based on gross parts requirements as determined by the production schedule. The sequence requirements are correlated with the production schedule and reflect the need for parts as indicated in the production schedule. The requests (which are usually in the form of 866 EDI transactions) do not account for on-hand inventory. As a result, the manufacturer requests delivery of more parts than are actually needed to build the manufactured products according to the production schedule. Furthermore, the on-hand inventory remains for as long as the parts delivery requests are gross-based because there is no procedure for incorporating them into the production process.

Parts sequencing is also costly to manufacturers because current systems and methods do not consider various factors related to lot sizes and parts when sending sequenced parts delivery requests. Current delivery request practices are based on one part per package as set forth in an 866 EDI transaction. Parts are not mixed within packages so some of the packages that are prepared and delivered are not full. As a result, the volume of data in 866 EDI transactions is significant thereby causing significant data transmission costs.

Current systems and methods for requesting delivery of sequenced parts to a production line are costly to manufacturers for various reasons. There is a need for an improved system and method for requesting delivery of sequenced parts that accounts for parts in inventory so that only the parts that are needed to meet the production schedule are delivered. There also is a need for an improved system and method for requesting delivery of sequenced parts that addresses related problems to lot sizes and mixing parts within packages. Finally, there is a need for an improved system and method for requesting delivery of sequenced parts that reduces transmission costs for associated EDI transactions by reducing the amount of data included in each transaction.

SUMMARY OF THE INVENTION

The present invention is a system and method for requesting delivery of sequenced parts that accounts for parts in inventory and addresses various problems related to current sequenced parts delivery requests. In the present invention, production schedule data as well as inventory data from a material requirements planning system is considered when requests for sequenced parts are issued to suppliers. The production schedule data is used to determine gross-based requirements that are modified based on inventory data to determine net-based requirements. In an example embodiment of the present invention, requirements are issued to suppliers using 862 EDI (Daily Ship Schedule) transactions rather than 866 EDI transactions as are commonly used today. Various factors are considered to determine how and when requests for sequenced parts should be issued to suppliers.

Parts according to the present invention are delivered in containers that may be transported to a production line for use by associates at the line. Lot data and related data are used to sequence the parts in the containers. The system and method support non-small lots (in which the number of parts requested is sufficient to fill a container or all parts in the container are identical) as well as small lots (in which the number of parts requested is insufficient to fill a container and the container is filled with different or mixed parts). Parts from small lots may be combined within a container so that containers are used more efficiently in the production process. Parts are sequenced within the containers (or racks)

as well as the transport vehicles that transport the part containers to the production facility or warehouse.

A batch number links lot numbers. The lot sequence numbers indicate the order in which lots are consumed during production. Each batch groups a collection of parts within containers for delivery to the production line and therefore, supports mixing of parts within a container. A lot sequence number (LSEQ) is used and transmitted in sequenced part delivery requests to indicate the order in which batches, lots, and therefore, parts are consumed during production and packed in a container or rack. The LSEQ information indicates the production line consumption order and therefore, priority for loading containers on a trailer with an applicable route/trailer time slot. Non-small lot as well as small lot containers may be sequenced within a trailer or transport vehicle.

The present invention manages small lots by determining whether the number of parts needed for production is sufficient to fill a container. Containers may have mixed parts or may be partially full and data related to such small lot conditions is communicated to suppliers in sequenced part delivery requests. The ability to manage small lots as well as to limit delivery requests for sequenced parts to small lots reduces the amount of data that must be submitted to suppliers in delivery requests. The use of 862 EDI transactions rather than 866 transactions also reduces the amount of data that must be transmitted to suppliers and therefore, reduces data transmission costs.

BRIEF DESCRIPTION OF THE DRAWINGS

FIG. 2 is a diagram illustrating the packing of small lot containers according to an example embodiment of the present invention.

DESCRIPTION OF EXAMPLE EMBODIMENTS

Figure 1:
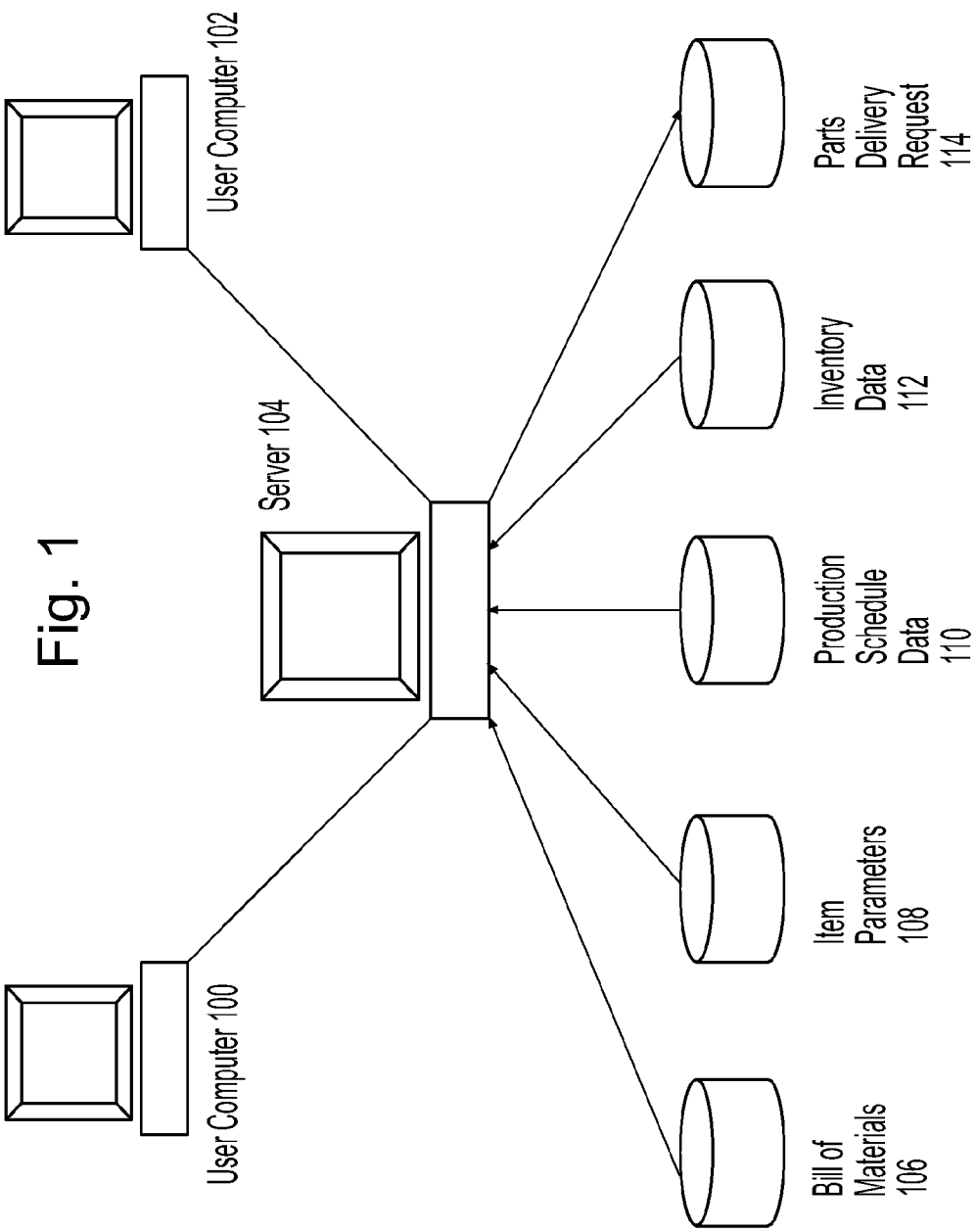
FIG. 1 is a system architecture for creating sequenced parts delivery requests for automobiles according to an example embodiment of the present invention.

The present invention may be implemented using a plurality of software modules that access data from multiple sources and interact to provide the features and functionality of the present invention. In an example embodiment of the present invention, the system and method for requesting delivery of sequenced parts is used in an automobile manufacturing facility. Referring to FIG. 1, a system architecture for creating sequenced parts delivery requests for automobiles according to an example embodiment of the present invention is shown. Users 100, 102 may access a server 104 that is loaded with software modules to interact with various systems such as a production schedule system and materials requirements planning system to determine appropriate delivery schedules according to the present invention. Parts data such as part numbers, descriptions, costs, etc. may be stored in bill of materials 106 and item parameters 108 databases. Production schedule data 110 identifies which models and types of automobiles will be manufactured on a particular production day and therefore, determines the parts requirements for each production day. The parts requirements as determined by the production schedule data reflect gross part requirements. Inventory data 112 regarding inventory on-hand is used in conjunction with production schedule data 110 to determine net part requirements. After the net part requirements are determined, a delivery schedule comprising lot numbers and batch numbers as well lot sequencing numbers is developed. Delivery date and delivery time information is also determined. Delivery schedule information is then incorporated into 862 EDI (Daily Ship Schedule) transactions and communicated to suppliers for delivery of sequenced parts 114.

One of the benefits of using an 862 EDI transaction is that it may contain data for non-sequenced as well as sequenced parts. Data transmission costs may be reduced if delivery requests for sequenced parts are limited to small lots that result in mixed parts within containers where ordering of parts for production facilitates the manufacturing process. The present invention, therefore, allows a manufacturer to control whether parts for non-small lots as well as small lots are sequenced.

A delivery schedule according to the present invention may comprise the following information. In the following example, each container holds 15 units. Using this container size, a non-small lot is 15 units and a small lot is fewer than 15 units. Small lots therefore include items with lot sequence numbers (LSEQs) 600, 601, 602, and 603. As indicated in table 1, each item has the same batch number but a different lot number. The batch numbers link lot numbers to create mixed packing priority.

TABLE 1

| Lot Sequence No. (LSEQ) | Lot No. | Batch No. | Delivery Date/Ship Time | Item | Part Level | Ship Schedule Number | Quantity/ Container | Quantity |
| --- | --- | --- | --- | --- | --- | --- | --- | --- |
| 600 | 9701 | 100101 | Oct. 10, 2004 13:00:00 | 645PTG AO | 10 | 734302 | 15 | 8 |
| 601 | 9703 | 100101 | Oct. 10, 2004 13:00:00 | 645PTG GO | 10 | 734306 | 15 | 7 |
| 602 | 9705 | 100101 | Oct. 10, 2004 13:00:00 | 645PTG GO | 10 | 734309 | 15 | 5 |
| 603 | 9704 | 100101 | Oct. 10, 2004 13:00:00 | 645PTG JO | 10 | 734312 | 15 | 8 |
| 604 | 9801 | 100101 | Oct. 10, 2004 13:00:00 | 645PTG GO | 10 | 734314 | 15 | 28 |

Containers, each of which may hold 15 units, are packed according to the above delivery schedule information as follows. A first container is packed with eight units of part 645PTG AO and seven units of part 645PTG GO (based on data in the first two rows of the table). The first container is identified as a small lot container and has mixed parts. A second container is packed with five units of part 645PTG GO, eight units of part 645PTG JO (based on data in the third and fourth rows of the table), and two units of part 645PTG GO (based on data in the fifth row of the table). It is also identified as a small lot container and has mixed parts. A third container is packed with 15 units of part 645PTG GO (based on the fifth row of the table). The container is identified as a non-small lot because it has 15 units of a single part. Finally, a fourth container is packed with 11 units of part 645PTG GO (also based on the fifth row of the table). It is identified as a small lot container because it has fewer than 15 units.

The part quantities identified in the last column of the table are net-based. As explained previously, gross parts requirements for production are determined by production schedule data. Inventory data from a material requirements planning system is used to determine the level of inventory on-hand that may be used in production. Gross parts requirements data is off-set by on-hand inventory data to determine net parts requirements so that only the additional parts that are needed for production are delivered. The material requirements planning system may track on-hand inventory that comes from the manufacturer's safety stock, supplier over ship stock, supplier mislabeled stock, etc. Use of on-hand inventory in establishing delivery schedules reduces costs to the manufacturer because the number of parts to be delivered is reduced and because the volume of data in electronic delivery requests to suppliers may be reduced and result in lower data transmission costs.

Referring to FIG. 2, a diagram illustrating the packing of small lot containers according to an example embodiment of the present invention is shown. Small lot containers comprise mixed parts. Containers are organized in batches which group collections of parts within containers for delivery to the production line. Batches are associated with the manufacturer's lot numbers. Sequence numbers indicate the order in which parts are packed in containers. Containers are labeled with lot, batch, and lot sequence information as well as part and delivery time information to facilitate handling. As indicated in FIG. 2, lot, batch, and container sizes may vary but are used to guide the process of packing containers.

A set of requirements 200 for packing a non-small lot is shown first. The container holds 60 units 200a. The corresponding batch size is 60 and the corresponding lot size is 30 200b. The requirements 200 indicate that 30 units of part X are associated with lot 110 and 30 units of part X are associated with lot 120. The same batch number—23456—is assigned to each lot. The sequence numbers indicate that a batch associated with lot 110 should be packed first and a batch associated with lot 120 should be packed second. The packed container 200b has 60 units of part X, 30 of which are associated with lot 110 and 30 of which are associated with lot 120.

A set of requirements 202 for packing a small lot indicates that 10 units of part A are associated with sequence number 1, batch 345678, and lot 210, 10 units of part B are associated with sequence number 2, batch 345678, and lot 220, 10 units of part C are associated with sequence number 3, batch 345678, and lot 230, and 30 units of part A are associated with sequence number 4, batch 345678, and lot 240. The groups of parts are associated with different lot numbers but the same batch numbers. The container and batch sizes are 60 while the lot size is 30 and the small lots have 10 units each 202a. The items may be packed in the container 202b as shown such that the parts A, B, and C of the small lots are packed on the left side of the container according to the respective sequence numbers 1, 2, and 3 and the parts of the non-small lot are packed on the right side which corresponds with sequence number 4.

A final set of requirements 204 for packing a small lot batch indicates that 15 units of part D are associated with sequence number 1, batch number 678901, and lot 310, 15 units of part E are associated with sequence number 2, batch number 678901, and lot 320, 30 units of part E are associated with sequence number 3, batch number 678901, and lot 320, 30 units of part D are associated with sequence number 4, batch number 987601, and lot 330, and 30 units of part E are associated with sequence number 5, batch number 987601, and lot 340. The container size is 120, the batch size is 60, the lot size is 30, and the small lots have 15 units each 204a. Sequence numbers 1–5 are all small lots that the supplier packs as specified in FIG. 2. The items may be packed in the container 204b on the left side as shown such that a small lot of part D is packed first according to its sequence number, a small lot of part E is packed next according to its sequence number, and a small lot of part E is packed next. Small lots of parts D and E are packed on the right side according to their respective sequence numbers.

Figure 3:
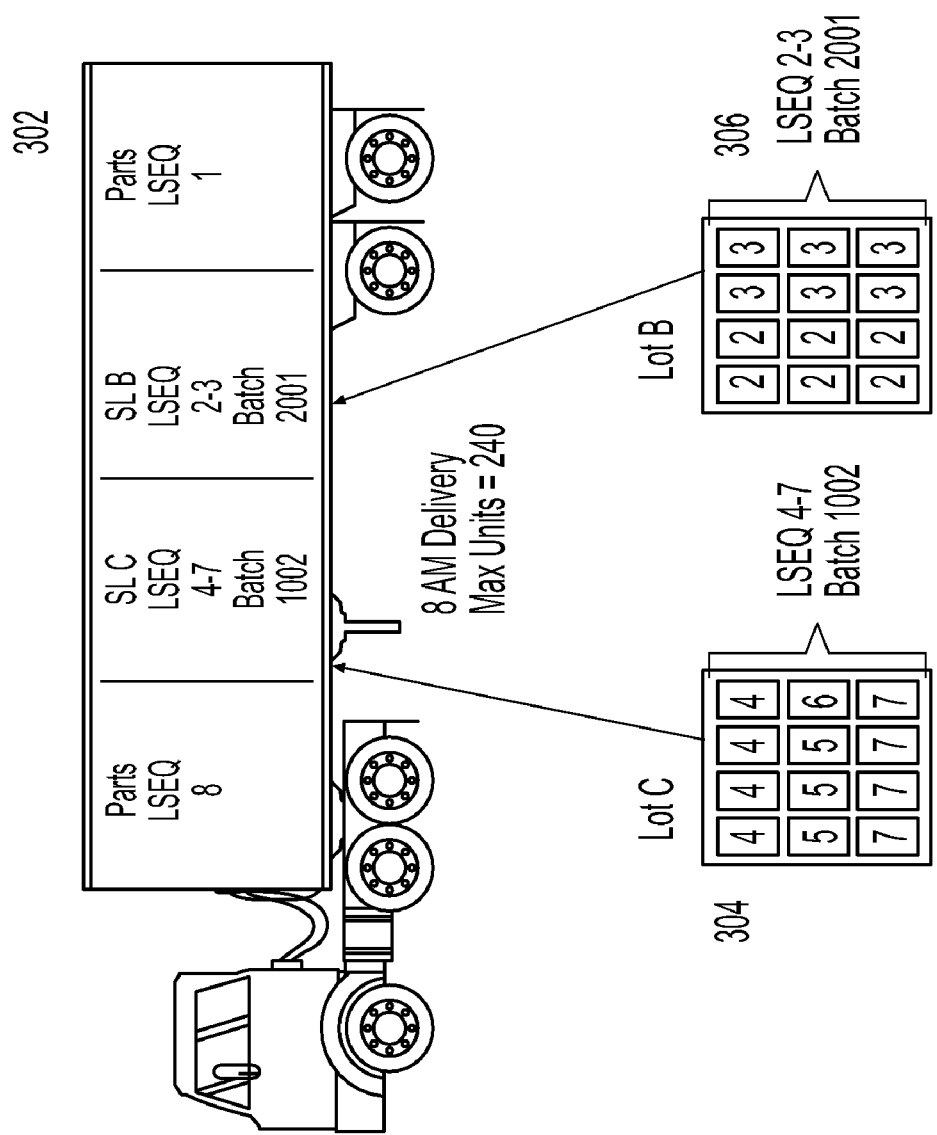
FIG. 3 is a diagram illustrating sequenced parts delivery according to an example embodiment of the present invention.

Referring to FIG. 3, a diagram illustrating sequenced parts delivery according to an example embodiment of the present invention is shown. A delivery processing schedule 300 identifies lot numbers and associated batch numbers as well as lot sequence numbers. Lot sequence numbers are used for reverse loading containers on trailers for delivery to a production line as well as for packing parts within containers. The trailer 302 is loaded initially with containers for batch number 2002 which comprises parts for lot D-1 (identified in the trailer 302 as Parts LSEQ 8). Next, containers for batch number 1002 which comprises parts for lot C 304 (C-1, C-2, C-3, and C-4) are loaded in the trailer 302 (identified in the trailer 302 as SL C LSEQ 4–7 Batch 1002). The parts for lot C may be packed in a plurality of containers that are loaded according to sequence numbers 4–7 as shown 304. Containers for batch number 2001 which comprises parts for lot B 306 (B-1 and B-2) are loaded in the trailer 302 next (identified as SL B SEQ 2–3 Batch 2001). The parts for lot B may be packed in a plurality of containers that are loaded according to sequence numbers 2–3 as shown 306. Finally, containers for batch 1001 which comprises parts for lot A-1 are loaded on the trailer 302 (identified as Parts LSEQ 1). As is apparent in FIG. 3, containers are reverse loaded on the trailer and unloaded from the trailer 302 in order according to the lot sequence numbers 1–8 which correspond to the batch numbers and lot numbers as shown in the delivery schedule 300. Although a trailer is described in the present example, any type of transport vehicle may be used to transport containers to a production facility or warehouse.

Using the present invention, parts are organized for delivery according to lot sequence data. The lot sequence data indicates the order in which parts are organized in containers as well as loaded on a transport vehicle for delivery to a production facility or warehouse. Parts may then be unloaded from the transport vehicle and from the containers in the order they are consumed on the production line. Net part requirements are in delivery schedules. Furthermore, sequencing of parts may be limited to small lots to reduce the volume of data in the delivery schedules. Delivery schedules are transmitted in 862 transactions that support requests for non-sequenced as well as sequenced parts.

While example embodiments of the invention have been illustrated and described, various modifications and combinations can be made without departing from the spirit and scope of the invention. For example, the features and functionality of the present invention may be implemented in fewer or more software modules than described according to an example embodiment of the present invention. In addition, lot sizes, batch sizes, and container sizes may be varied to meet manufacturing requirements. Modifications, combinations, and equivalents to the system and method of the present invention are intended to be covered and claimed.

What is claimed is:

1. A computerized method for requesting delivery of sequenced parts comprising:
    determining parts requirements using production schedule data;
    determining on-hand inventory for parts related to said parts requirements determined using production schedule data;
    modifying said parts requirements based on said on-hand inventory for parts related to said parts requirements;
    establishing a delivery schedule for said modified parts requirements, said delivery schedule comprising associated lot sequence numbers, batch numbers, and part identifiers wherein said lot sequence numbers indicate an order in which parts with said part identifiers are organized in containers and said batch numbers group parts with said part identifiers within said containers;
    transmitting said delivery schedule electronically to a supplier; and
    receiving from said supplier parts organized in containers according to said lot sequence numbers and said batch numbers wherein at least one of said containers 1) comprises parts with different part identifiers or 2) is partially full.

2. The method of claim 1 wherein said delivery schedule further comprises a delivery date and a delivery time.

3. The method of claim 1 wherein said on-hand inventory comprises inventory selected from the group consisting of manufacturer safety stock, supplier over ship stock, and supplier mislabeled stock.

4. The method of claim 1 wherein at least one of said containers is completely filled with identical parts.

5. The method of claim 1 wherein lot sequence numbers indicate an order for loading parts in transport vehicles.

6. The method of claim 1 wherein establishing a delivery schedule for said modified parts requirements further comprises associating lot numbers with said part identifiers, said batch numbers, and said lot sequence numbers.

7. The method of claim 1 wherein transmitting said delivery schedule electronically to a supplier comprises transmitting said delivery schedule as a transaction for ordering sequenced and non-sequenced parts.

8. A computerized system for requesting delivery of sequenced parts to a production comprising:
    gross parts requirement data determined in accordance with production schedule data;
    parts inventory data related to said gross parts requirement data;
    net parts requirements data wherein said net parts requirements data is determined based on said gross parts requirements data and said parts inventory data;
    an electronic delivery schedule for said net parts requirements data, said electronic delivery schedule comprising lot sequence numbers associated with parts identified in said net parts requirements data for indicating an order for loading said parts in containers and batch numbers for grouping in said containers said parts associated with said lot sequence numbers;
    containers for holding specified quantities of parts wherein parts are loaded in said containers according to said lot sequence numbers and said batch numbers and wherein at least one of said containers comprises parts with different part identifiers or comprises fewer than a specified quantity of parts; and
    a transport vehicle for transporting said containers to said production line wherein said containers are loaded in said transport vehicle according to said lot sequence numbers.

9. The system of claim 8 wherein said delivery schedule further comprises a delivery date and a delivery time.

10. The system of claim 8 wherein said on-hand inventory is selected from the group consisting of manufacturer safety stock, supplier over ship stock, and supplier mislabeled stock.

11. The system of claim 8 wherein at least one of said containers is completely filled with identical.

12. The system of claim 8 wherein said electronic delivery schedule is a transaction for ordering sequenced and non-sequenced parts.

13. A computerized method for delivering supplies to a production line comprising:
    determining net parts requirements data for a manufactured product based on gross parts requirements data and on-hand inventory data;
    associating lot numbers with parts identified in said net parts requirements data;
    associating batch numbers with said lot numbers for grouping parts within a container;
    associating lot sequence numbers with said lot numbers wherein said lot sequence numbers correspond to the order in which parts are consumed on said production line;
    establishing a delivery schedule comprising said lot numbers, said batch numbers, and said lot sequence numbers in association with said net parts requirements data;
    transmitting said delivery schedule to a supplier;
    packing parts in containers according to said lot sequence numbers and said batch numbers wherein each container has a specified quantity and at least one container comprises non-identical parts or fewer parts than said specified quantity;
    loading said containers in a transport vehicle according to said lot sequence numbers;
    transporting said containers in said transport vehicle from said supplier to a production facility;
    unloading said containers from said transport vehicle in order according to said lot sequence numbers;
    delivering said containers to said production line; and
    consuming parts from said containers at said production line in order according to said lot sequence numbers.

14. The method of claim 13 wherein packing parts in containers comprises packing identical parts in at least one container.

15. The method of claim 13 wherein said on-hand inventory is selected from the group consisting of manufacturer safety stock, supplier over ship stock, and supplier mislabeled stock.

16. The method of claim 13 wherein said delivery schedule comprises a delivery date and a delivery time.

17. The method of claim 13 wherein transmitting said delivery schedule to a supplier comprises transmitting said delivery schedule as a transaction for ordering sequenced and non-sequenced parts.

18. A computerized system for delivering supplies to a production facility comprising:
- net parts requirements data for a manufactured product wherein said net parts requirements data is determined according to gross parts requirements data and on-hand inventory data;
- means for associating lot numbers with parts identified in said net parts requirements data;
- means for associating batch numbers with said lot numbers wherein said batch numbers are used to group parts within a container;
- means for associating said lot sequence numbers with said lot numbers wherein said lot sequence numbers correspond to the order in which parts are consumed on said production line;
- a delivery schedule comprising said lot numbers, said batch numbers, and said lot sequence numbers associated with said net parts requirements data;
- means for transmitting said delivery schedule to a supplier;
- containers comprising parts packed by said supplier according to said lot sequence numbers and said batch numbers wherein at least one of said containers comprises parts with different part identifiers or comprises fewer parts than a specified quantity for said at least one of said containers; and
- a transport vehicle for transporting said containers from said supplier to said production facility.

19. The system of claim 18 wherein at least one of said containers comprises identical parts.

20. The system of claim 18 wherein said on-hand inventory comprises inventory selected from the group consisting of manufacturer safety stock, supplier over ship stock, and supplier mislabeled stock.

21. The system of claim 18 wherein said delivery schedule comprises a delivery date and a delivery time.

22. The system of claim 18 wherein said delivery schedule is a transaction for ordering sequenced and non-sequenced parts.

* * * * *

UNITED STATES PATENT AND TRADEMARK OFFICE
CERTIFICATE OF CORRECTION

| | | |
|---|---|---|
| PATENT NO. | : 7,218,982 B1 | Page 1 of 1 |
| APPLICATION NO. | : 11/000785 | |
| DATED | : May 15, 2007 | |
| INVENTOR(S) | : Koenig et al. | |

It is certified that error appears in the above-identified patent and that said Letters Patent is hereby corrected as shown below:

In column 8, lines 22-23, please delete "11. The system of claim 8 wherein at least one of said containers is completely filled with identical." and insert -- "11. The system of claim 8 wherein at least one of said containers is completely filled with identical parts. --

Signed and Sealed this

Twenty-sixth Day of June, 2007

JON W. DUDAS
*Director of the United States Patent and Trademark Office*